United States Patent [19]

Strehler et al.

[11] 4,289,223
[45] Sep. 15, 1981

[54] SHIFTABLE FRICTION CLUTCH FOR GEAR DRIVES

[75] Inventors: Richard Strehler, Unterfoehring; Max Bartl, Munich, both of Fed. Rep. of Germany

[73] Assignee: Carl Hurth Maschinen- und Zahnradfabrik GmbH & Co., Munich, Fed. Rep. of Germany

[21] Appl. No.: 41,923

[22] Filed: May 24, 1979

[30] Foreign Application Priority Data

Jun. 30, 1978 [DE] Fed. Rep. of Germany ....... 2828722

[51] Int. Cl.³ .................... F16D 21/04; F16D 43/21
[52] U.S. Cl. .................................. 192/48.91; 192/54
[58] Field of Search ............... 192/54, 48.91, 21, 52, 192/93 A; 74/404

[56] References Cited

U.S. PATENT DOCUMENTS

| | | | |
|---|---|---|---|
| 2,546,712 | 3/1951 | Avila | 192/48.91 X |
| 2,874,817 | 2/1959 | Altmann | 192/54 X |
| 3,189,147 | 6/1965 | Holdeman | 192/48.91 |
| 3,203,525 | 8/1965 | Herbst | 192/66 |
| 3,703,226 | 11/1972 | Strehler et al. | 192/54 X |
| 4,118,996 | 10/1978 | Eichinger | 192/54 X |

FOREIGN PATENT DOCUMENTS 1625849 7/1973 Fed. Rep. of Germany .
2225096 12/1976 Fed. Rep. of Germany .

Primary Examiner—Rodney H. Bonck
Attorney, Agent, or Firm—Blanchard, Flynn, Thiel, Boutell & Tanis

[57] ABSTRACT

A shiftable friction clutch for gear drives, in which a shift collar is arranged axially movably on a carrier sleeve which is mounted on the shaft which must be coupled to a gear, and in which at least one axially movable friction ring is provided, which belongs to a first clutch half and which cooperates through clutch friction surfaces with a second clutch half and which is supported through rolling elements on the carrier sleeve for producing the contact pressure by means of pressure surfaces which are arranged on the front surfaces remote from the clutch surfaces and which are inclined with respect to the plane of rotation. The friction clutch is constructed as a spring-loaded safety clutch, in which the friction members which are pressed onto one another during the starting or engagement operation are supported against a spring.

4 Claims, 4 Drawing Figures

SHIFTABLE FRICTION CLUTCH FOR GEAR DRIVES

FIELD OF THE INVENTION

This invention relates to a shiftable friction clutch for use particularly in driving gears.

BACKGROUND OF THE INVENTION

A friction clutch of this type is known from German Auslegeschrift No. 16 25 849, first published on Aug. 20, 1970, in which the spring for the safety clutch is arranged in the power flow - viewed from the clutch pack - behind the gear which must be coupled, so that when the safety clutch becomes effective, the gear must move. Thus the safety clutch is burdened with the mass of the gear, which can lead to difficulties during shifting, which are noticed externally by a chatter noise during shifting.

These disadvantages are overcome, if the masses in the power flow are arranged behind the spring first published Dec. 6, 1973 (German Patentschrift No. 2 225 096), so that the initial tension force of the spring is being influenced by as little mass as possible, in particular not by the mass of the movable gear. For certain cases of use, primarily if only small powers are to be transmitted, the installed length of this construction is relatively great. The transmission volume and thus the transmission price can therewith not be reduced proportionally with the output in the lower power range.

Other types of known structures are disclosed in U.S. Pat. Nos. 3,203,525 and 3,703,226.

Therefore, the basic purpose of the invention is to provide a friction clutch of the above-described type, which has at a relatively small assembled length still only small masses which act onto the spring.

This purpose is inventively attained by the carrier sleeve being mounted axially movably on the shaft and the supporting spring being arranged on the side of the carrier sleeve remote from the clutch friction surfaces, between the carrier sleeve and the shaft or between the carrier sleeve and a part which is fixedly connected to the shaft.

To increase the operating safety, two stops are arranged as is actually known, to limit the axial movement of the friction ring in direction of the clutch engagement of which stops the first is effective until the torque is exceeded and the second during an exceeding of the maximum permissible torque.

A preferable development of the invention is achieved, when the second stop is arranged acting in peripheral direction. Stops which act in peripheral direction are known. The friction ring which is supported through rolling elements on the guide sleeve carries out a helical movement, that is, a movement in both the axial direction and the peripheral direction. The stop which acts in peripheral direction prevents a jamming of the rolling elements or of the friction ring at high torque. The invention becomes particularly advantageous with an arrangement of the spring in the annular space which is formed by the carrier sleeve, shaft, gear and clutch element to thereby provide a compact solution.

BRIEF DESCRIPTION OF THE DRAWINGS

The invention will be discussed with reference to FIGS. 1 to 4.

In the drawings.

DETAILED DESCRIPTION

Figure 1:
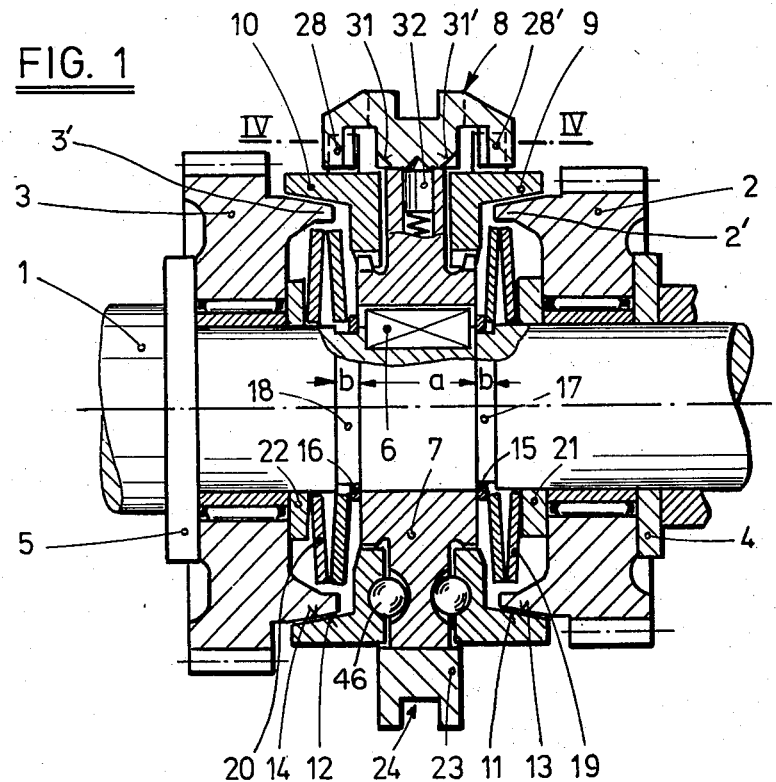
FIG. 1 is a longitudinal cross-sectional view of a clutch according to the invention.

FIG. 1 illustrates as an exemplary embodiment a double clutch having conical friction surfaces. A shaft 1 is to be selectively connected through a friction coupling to the gears 2, 3, which are rotatably supported on the shaft and are held against axial movement by suitable means, for example by plates 4 or a shoulder 5. A carrier sleeve 7 is slidably mounted on the shaft 1 and is axially movable between the two gears. The carrier sleeve is fixed against rotation relative to the shaft 1 by at least one adjusting spring 6. The carrier sleeve will be discussed in more detail below. A shift collar 8 is longitudinally movably guided on the carrier sleeve. The shift collar 8 is secured against rotation relative to the carrier sleeve by not shown conventional means. A friction ring 9, 10 is concentrically arranged to the axis of rotation on each side of the carrier sleeve. The outside diameter of the friction rings corresponds approximately to the outside diameter of the carrier sleeve. The friction rings each have an inner conical surface 11, 12 which cooperates with an adjacent outer conical surface 13, 14 on the gears 2, 3.

Figure 3:
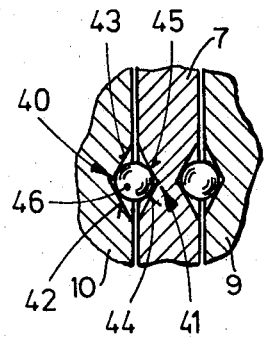
FIG. 3 is a partial cross-sectional view of the rolling elements lying between inclined planes.

The friction rings 9, 10 and the carrier sleeve 7 have milled recesses 40, 41 on the sides facing one another (FIG. 3). Said milled recesses each have two flat inclined planar surfaces 42, 43, 44, 45. Balls 46 lie therebetween and function as rolling elements. When one friction ring and the carrier sleeve are relatively rotated with respect to one another, the balls 46 run onto the flat inclined planes, which thus serve as a ramp, and thereby urge the friction ring away from the carrier sleeve, which causes the aforementioned cones to be pressed into engagement with one another. As a result, the connected gear is coupled through its outer conical surface, the associated inner conical surface, the respective friction ring, the respective balls and the carrier sleeve 7 to the shaft 1. Differing from FIG. 3, the milled recesses can also be inclined such that the rolling elements can run only in one direction of rotation onto the ramp surface.

Figure 4:
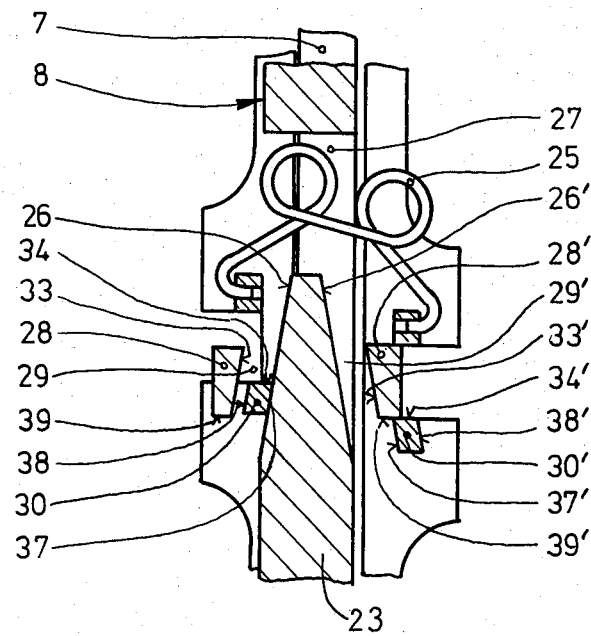
FIG. 4 is a cross-sectional view taken along the line IV—IV of FIG. 1 and illustrates schematically a phase during the shifting cycle.

The friction rings 9, 10 are urged by one or several return springs 25 (FIG. 4) toward the carrier sleeve, which are arranged on the periphery of the friction rings and are constructed as coiled flat springs, so-called hairpin or torsion springs. Projections are provided on the periphery of the friction rings for supporting these springs.

The shift collar 8 includes a sleeve member 23, which is provided on the radially outer periphery thereof with an annular groove 24 for receiving a conventional, hence not shown, gearshift fork therein. The sleeve member 23 has on the axially facing sides thereof two inclined surfaces which converge toward the center, which surfaces are called first pressure surfaces 26, 26'. When the planar surfaces, for example 42, of the friction members, which surfaces serve as a ramp for the rolling elements, are sloped in a certain peripheral direction, enlarging the milled recesses 40, 41, then the first pressure surfaces 26, 26' taper in the same direction toward each other and may come together in the central plane (rotation plane) of the sleeve member. Openings 27 follow the part of the sleeve member which forms the first pressure surfaces, which openings receive the mentioned return springs 25. Blockers 28, 28' are provided on the sleeve member at an axial distance from the first pressure surfaces 26, 26' and form on the side which faces the first pressure surfaces countersurfaces or second pressure surfaces 33, 33' which are parallel with the first pressure surfaces. The sleeve member and the blocks thus form inwardly open grooves 29, 29'. Teeth 30, 30' are provided on the periphery of the friction members, which teeth are each provided on the side facing the sleeve member 23 with a counter pressure surface 37, 37', which extend parallel with respect to the aforementioned first pressure surfaces 26, 26' on the sleeve member. Each tooth has on the other side a countersurface 38, 38', which extends parallel with respect to the facing countersurface 33, 33' on the blocker. The grooves 29, 29' are wider in axial direction than the teeth 30, 30'. The teeth have a stop surface 34, 34' approximately in a plane which extends through the axis of rotation and on the side which faces the blocker, which surface is directed approximately at a right angle with respect to the plane of rotation (direction of rotation). On the side which faces the teeth, the blockers 28, 28' have a stop surface 39, 39', which is also directed approximately at a right angle with respect to the plane of rotation. Upon an energizing of the clutch, caused by a shifting of the sleeve member 23, the first pressure surfaces, for example 26, is urged onto the counter pressure surface, for example 37, and, as a result, the rotating friction ring 10 is moved toward and into engagement with the friction surface 12 on the gear 3 to cause the transmission of torque to be started. The transmittable torque is thereafter increased by the balls 46 which are caused to run onto the ramps when a relative rotation occurs between the friction ring 10 and carrier sleeve 7. Disengagement of the clutch is done by urging the countersurfaces of the sleeve member onto the countersurface of the friction ring. The cooperation of the stop surfaces 39, 39' with the stop surfaces 34, 34' prevents the disengaged friction ring 9 from being engaged unintentionally.

A latch pin 32 which is loaded by a spring is radially movably guided in the carrier sleeve 7. A recess for locking the gearshift sleeve in the disengaged condition (neutral position) is provided in the center of the sleeve member. Two locking openings which are open toward the side, thus are half locking openings, or inclined surfaces 31, 31' are provided on the front sides of the gearshift sleeve for fixing the two starting conditions. The latch pin 32 and the inclined surfaces 31, 31' on the front sides of the gearshift sleeve member support the starting operation.

Figure 2:
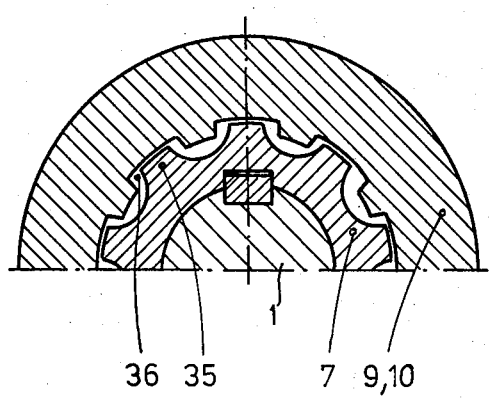
FIG. 2 is a cross-sectional view of the stop device according to the invention.

The carrier sleeve 7 is, as already mentioned, axially movable on the shaft 1. It is held in its neutral position by two snap rings 15, 16 which are placed with little radial clearance in annular grooves 17, 18 in the shaft 1. The grooves are wider than the snap rings and the distance a between their lateral limits which face the carrier sleeve corresponds substantially with the width of the carrier sleeve. Belleville springs 19, 20 engage on one side thereof the side of the snap rings remote from the carrier sleeve, and engage on the other side a plate 21, 22 which axially guides the gear 2, 3. The effect of the Belleville springs will be discussed below. The carrier sleeve 7 has, as illustrated in FIG. 2, on its hub part on both sides, projections 35 or the like which extend radially outwardly and are received in corresponding recesses 36 on the friction rings 9, 10. The recesses are wider in peripheral direction than the projections and function as a stop for the respective friction ring, which can rotate only through a limited angle relative to the carrier sleeve 7. Since during coupling the rolling elements run onto the ramps, the friction ring needs for its axial movement a mobility in the peripheral direction. Since on the other hand the projections limit the amount of movability, they serve also as a stop for the axial movement of the friction ring. The friction ring is not supported on a fixed part during coupling, but through the rolling elements on the resiliently supported or centered carrier sleeve. The maximum friction force and thus the maximum transmittable torque thus depends on the force of the springs 19 or 20. If during an engagement function the respective friction ring, for example 10, is supported by the balls 46 on the carrier sleeve 7, then the carrier sleeve yields to the force of the Belleville springs 19, in FIG. 1 thus to the right. The friction ring 10 is thus loaded by the Belleville springs 19 in the sense of an engagement. The Belleville springs 20 remain hereby without importance, because their initial force does not change during the yielding of the carrier sleeve to the right, because the snap ring 16 rests on the groove wall. As a result, it is assured that a defined force acts from the Belleville springs 19 onto the friction surfaces (conical surfaces 12, 14) and only the Belleville springs 19 are decisive for the maximum transmittable torque.

An exceeding of the predetermined overload moment through the occurrences of power surges, as it can occur otherwise during engagement at high speeds or in boat transmissions for example during the ground contact, is not possible in the case of the described clutch. Due to the given arrangement, the springs 19, 20 are not able to act onto the friction surfaces (conical surfaces 11, 13; 12, 14) in a disengaged condition, because the snap rings 15, 16 each engage a wall of the respective groove 17, 18 adjacent the carrier sleeve 7 and, as a result, the spring travel is limited in a direction toward the friction surfaces. The width b of the grooves 17, 18 is, moreover, dimensioned such that the snap rings cannot rest on the groove walls adjacent the gears, because the projections 35 already strike the walls of the recesses 36.

The clutch shifts very softly, namely without chatter, because the initial tension force of the Belleville springs 19, 20 is influenced only by small mass forces, in particular the mass of the gears 2 and 3 is kept away from the Belleville springs.

The described clutch is built very compactly, because the Belleville springs are housed within the actual cone clutch construction, namely the Belleville springs 19, 20 are surrounded with a radial clearance by the parts 2', 3' of the gears 2, 3, which parts have the outer conical surfaces 13, 14. The invention is not limited to the above example of use. It can be applied among others also in one-sided clutches or in multiple disk clutches. Furthermore, the design of the individual structural parts as for example the stops, the friction surfaces, etc. is not limited to the described and/or illustrated embodiment.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shiftable friction clutch for gear drives comprising a shift collar axially movably supported on a carrier sleeve mounted on a shaft and which must be coupled to a gear, at least one axially movable friction ring constituting a first clutch half and cooperating with a second clutch half through clutch friction surfaces, said first clutch half being axially movably supported through rolling elements engaging inclined surfaces on axially mutually facing sides of said carrier sleeve and said friction ring, said inclined surfaces being inclined with respect to the plane of rotation, the improvement comprising wherein said carrier sleeve is mounted for axial movement on said shaft and wherein a supporting spring is provided on the side of said carrier sleeve remote from said clutch friction surfaces between said carrier sleeve and said shaft for limiting the maximum transmittable torque when said clutch friction surfaces are in engagement with each other.

2. The shiftable friction clutch according to claim 1, wherein the axial movement of said friction ring which is moved axially by said rolling elements which run onto said inclined surfaces is limited in direction toward said clutch friction surface in the direction of clutch engagement by at least a first stop means.

3. The shiftable friction clutch according to claim 2, wherein a second stop means is provided for limiting the movement of said friction ring in the peripheral direction.

4. The shiftable friction clutch according to claim 1, wherein said supporting spring is housed in an annular chamber defined substantially by the axially facing and opposed sides of said carrier sleeve and an axially fixed structural part on said shaft on a side of said carrier sleeve remote from said clutch friction surfaces, and the periphery of said shaft.

* * * * *